(12) United States Patent
Tokushima et al.

(10) Patent No.: US 8,873,906 B2
(45) Date of Patent: Oct. 28, 2014

(54) OPTICAL CONVERSION ELEMENT AND OPTICAL CONVERSION ELEMENT MANUFACTURING METHOD

(75) Inventors: Masatoshi Tokushima, Ibaraki (JP); Shigeru Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/878,295

(22) PCT Filed: Sep. 22, 2011

(86) PCT No.: PCT/JP2011/005328
§ 371 (c)(1),
(2), (4) Date: Apr. 8, 2013

(87) PCT Pub. No.: WO2012/046401
PCT Pub. Date: Apr. 12, 2012

(65) Prior Publication Data
US 2013/0188910 A1      Jul. 25, 2013

(30) Foreign Application Priority Data
Oct. 8, 2010    (JP) ................. 2010-228086

(51) Int. Cl.
| | |
|---|---|
| G02B 6/26 | (2006.01) |
| B29D 11/00 | (2006.01) |
| G02B 6/30 | (2006.01) |
| G02B 6/122 | (2006.01) |

(52) U.S. Cl.
CPC .......... *G02B 6/268* (2013.01); *B29D 11/00663* (2013.01); *G02B 6/305* (2013.01); *G02B 6/1228* (2013.01)
USPC ............... 385/28; 385/31; 385/129; 264/1.25

(58) Field of Classification Search
CPC .... G02B 6/1228; G02B 6/305; G02B 6/1223; G02B 6/14; G02B 2006/12069; G02B 2006/12097; G02B 6/136; G02B 6/268; G02B 6/138; B29D 11/00663; B82Y 20/00
USPC ................. 385/28, 43, 49, 50, 132, 129, 31; 264/1.25
See application file for complete search history.

(56) References Cited

U.S. PATENT DOCUMENTS

| | | | |
|---|---|---|---|
| 6,396,984 | B1 | 5/2002 | Cho et al. |
| 6,631,225 | B2 | 10/2003 | Lee et al. |

(Continued)

FOREIGN PATENT DOCUMENTS

| | | |
|---|---|---|
| JP | 5-249331 | 9/1993 |
| JP | 7-110415 | 4/1995 |

(Continued)

OTHER PUBLICATIONS

M. Kohtoku, S. Oku, Y. Kadota, and Y. Yoshikuni, "Spotsize Converter With Improved Design for InP-Based Deep-Ridge Waveguide Structure," J. Lightwave Technol. 23, 4207—(2005).*

(Continued)

*Primary Examiner* — Peter Radkowski
(74) *Attorney, Agent, or Firm* — Young & Thompson

(57) ABSTRACT

Disclosed is an optical conversion element capable of highly efficient optical coupling between a silicon waveguide and a general single-mode optical fiber only by butt-coupling without requiring anti-reflective coating. One embodiment is an optical conversion element that includes a waveguide structure and converts a mode field of guided light and is characterized in that at least a dual core is included, an innermost core of the dual core is a silicon inverse tapered thin wire core, a first outer core is a forward tapered ridge core having a ridge structure formed of an oxide film with only width of the ridge core changing. The first outer core is positioned on a narrow width side of the innermost core.

16 Claims, 12 Drawing Sheets

(56) References Cited

U.S. PATENT DOCUMENTS

| | | | |
|---|---|---|---|
| 6,697,551 B2 * | 2/2004 | Lee et al. | 385/28 |
| 6,870,987 B2 * | 3/2005 | Lee | 385/28 |
| 8,116,602 B2 * | 2/2012 | Little et al. | 385/27 |
| 2002/0031296 A1 | 3/2002 | Lee et al. | |
| 2002/0118916 A1 * | 8/2002 | Lee et al. | 385/28 |
| 2004/0037497 A1 * | 2/2004 | Lee | 385/28 |
| 2010/0266288 A1 * | 10/2010 | Little et al. | 398/139 |

FOREIGN PATENT DOCUMENTS

| | | |
|---|---|---|
| JP | 7-168146 | 7/1995 |
| JP | 9-311232 | 12/1997 |
| JP | 10-160976 | 6/1998 |
| JP | 2000-214341 | 8/2000 |
| JP | 2004-503800 | 2/2004 |
| JP | 2005-331967 | 12/2005 |
| JP | 2007-093743 | 4/2007 |
| JP | 2009-036877 | 2/2009 |
| WO | 2008114624 | 9/2008 |

OTHER PUBLICATIONS

T. Shoji et al., "Low loss mode size converter from 0.3 μm square Si wire waveguides to singlemode fibres", Electronics Letters, vol. 38, No. 25, pp. 1669-1670 (2002).

M. Kohtoku et al., "Spotsize converters integrated with deep ridge waveguide structure", Electronic Letters, Dec. 10, 1998, vol. 34, No. 25, p. 2403-2404.

Masaki Kohtoku et al., "Spotsive Converter With Improved Design for InP-Based Deep-Ridge Waveguide Structure", Journal of Lightwave Technology, Dec. 2005, vol. 23, No. 12, p. 4207-4214.

T. Bakke et al., "Polymeric buried core adiabatic optical spot-size transformer", Electronics Letters, Mar. 28, 2002, vol. 38, No. 7, p. 319-321.

International Search Report PCT/JP2011/005328 dated Nov. 29, 2011, with English translation.

Daoxin Dai et al., "Bilevel Mode Converter Between a Silicon Nanowire Waveguide and a Larger Waveguide", Journal of Lightwave Technology, vol. 24, No. 6, Jun. 2006, pp. 2428-2433.

* cited by examiner

OPTICAL CONVERSION ELEMENT AND OPTICAL CONVERSION ELEMENT MANUFACTURING METHOD

TECHNICAL FIELD

The present invention relates to an optical conversion element and an optical conversion element manufacturing method, and particularly to an optical conversion element and an optical conversion element manufacturing method for realizing highly efficient optical coupling between a thin wire waveguide including a medium with a high refractive index such as silicon as a core and a single-mode optical fiber for optical communication.

BACKGROUND ART

An optical waveguide with its core being formed of a medium with a high refractive index such as silicon barely generates an optical loss even in the case of a sudden bend, thereby making it suitable for integration of optical circuits. One of optical waveguides attracting attention is an optical waveguide using a Silicon-on-Insulator (SOI) substrate.

The SOI substrate is composed of a silicon base substrate, a Buried Oxide (BOX) layer thereon, and a silicon layer (SOI layer) on the BOX layer. With the SOI substrate, the SOI layer is processed to form a core with a high refractive index, and the BOX layer can be used as lower cladding with a low refractive index, thereby facilitating manufacture of a silicon thin wire waveguide (channel waveguide) and a ridge waveguide (rib waveguide). An oxide film to be top cladding is deposited as necessary.

A core of the silicon thin wire waveguide for an optical circuit generally has a rectangular or square cross-section, and in the case of a single-mode, a core with an approximately 400 nm width and 200 nm height, for example, is often used. Moreover, a core with a structure including slabs (plate structure) with a thickness of 50 to 100 nm on both sides of the silicon thin wire waveguide is often used for a core of a silicon ridge waveguide.

As in the above explanation, since the silicon thin wire waveguide and ridge waveguide for optical circuits have a fine core, a mode field of light propagating therethrough is also fine with its width and height about less than or equal to 1 µm. Although a small core size and mold field size are advantageous to integration of optical circuits, they pose a problem in optical coupling with an external optical system.

As for a general single-mode optical fiber for transmitting an optical signal, a diameter of a core is about 8 µm, and a diameter of the mode field size at a wavelength 1.55 µm is about 10 µm, which are larger than those of the thin wire waveguide.

A cheap optical coupling method is to establish a connection by butting a cutting endface of an optical fiber to an endface of a waveguide, which is an input and output end of an optical circuit. However, an optical conversion element for converting a spot size must be created at the input and output end of the optical fiber in order to achieve high optical coupling efficiency by this butt coupling.

Note that the mode field size is a size of a field (usually an electric field) in an eigenmode of a waveguide. In this specification, the mode field size indicates a field size in a fundamental mode except as otherwise specified. Further, the spot size is the field size of light immediately after being emitted from a waveguide. In the case of a multi-mode waveguide, light in several eigenmodes may be mixed.

However, this specification assumes only the fundamental mode as described above when referring to the mode field, thus the mode field size and the spot size shall be used in the same meaning.

Non-patent literature 1 discloses a spot size converter (optical conversion element) (hereinafter referred to as a first technique). The spot size converter has a dual core structure including a first core formed of a silicon thin wire and a second core with a larger cross-sectional area than the first core and disposed to cover the first core. Further, a first core has a tapered structure with its width decreasing gradually toward a side to be connected to an optical fiber.

An operation of the spot size converter according to the first technique is explained below. Most of the mode field of light entered to the first core from a thin wire waveguide side is distributed within the first core at a wide width part. When guided light advances and the width of the waveguide is reduced sufficiently lower than a half waveguide, the mode field overflows outside the first core and is filled within the second core. Finally, the size of the mode field expands to the size of the second core, thereby facilitating optical coupling with an optical fiber.

The configuration of spot size conversion that expands the mode field by gradually narrowing the core size to less than or equal to the half wavelength is referred to as a reverse tapered type as the direction to which the core size expands is opposite to the direction to which the mode field size expands.

It is necessary to conform the size and the shape of the mode field of the guided light in order to improve the optical coupling efficiency of two waveguides, however it is also necessary to conform effective refractive indices of the guided light at the same time. The effective refractive index is related to a strength ratio of the electric field and magnetic field, and has a value between the refractive index of the material forming the core and the refractive index of the material forming the cladding, depending on the structure of the waveguide.

Although the mode field usually indicates distribution of an electric field, high optical coupling efficiency cannot be achieved unless distribution of magnetic field is conformed at the same time. Conforming the refractive indices together with the mode fields is equivalent to conforming the distribution of the electric field and distribution of the magnetic field of the guided light. When the effective refractive indices are not conformed, light is reflected at an interface between the connected two waveguides, thereby reducing the optical coupling efficiency.

The spot size converter according to the first technique can largely change the refractive indices of the material forming the first core and the material forming the second core. Even when the material forming the first core is material with a high refractive index, with a small cross-sectional area of the core, the effective refractive index of the guided light will be close to the refractive index of the material forming the second core. As the cross-sectional area of the second core is large, when the refractive index of the material forming the second core is made to be the same degree as the refractive index of the material forming the optical fiber, the effective refractive index of the guided light in the second core can be made close to the effective refractive index of the guided light in the optical fiber.

The spot size converter with the tapered structure realizes high conversion efficiency by adiabatically changing the mode field. An issue in the spot size converter according to the first technique is that the larger a difference in the sizes of the first core and the second core, the more difficult an adiabatic change in the mode field would be. Theoretically, when the size of the first core is made close to zero, it is possible to expand the size of the mode field to infinite.

However, in practice, the greater the ratio of the mode field expanded outside the first core, the larger the ratio of the change in the mode field size to the change in the size of the first core, thereby making a gradual change in the mode field size difficult.

In order to still achieve a gradual change in the mode field size, the change in the reverse taper width of the first core needs to be further gradual as long as a limit of processing accuracy is not including resolution accuracy of lithography and surface roughness by etching. Consequently, the size of the mode field that can adiabatically change is limited.

In the spot size converter disclosed in the first technique, such a reason limits a mode diameter (diameter) of the optical fiber that is optically coupled by butt coupling of the silicon thin wire waveguide to 4.3 82 m. Since the mode diameter (diameter) of the single-mode optical fiber generally used in the optical communication is about 10 µm, the spot size converter disclosed in the first technique cannot be used.

There are other structures suggested for the optical conversion element that can expand the spot size of the silicon waveguide. They operate by a different mechanism from the spot size converter disclosed in the first technique.

Patent literature 1 (hereinafter referred to as a second technique) discloses a spot size converter having a structure that covers a thin wire core by material with an almost same refractive index as that of material forming the thin wire core, which is a first core, in a way that the material is gradually thicker toward an endface on an optical fiber side. The covering material and the entire first core compose a second core. Since the covering material and the material forming the first core is almost the same, the structure can be considered as being formed by simply expanding a cross-sectional area of the first core.

In the spot size converter according to the second technique, as a cross-sectional size of a core of a waveguide is greater than a half wavelength of guided light, a mode field of the guided light expands along with an expansion in the cross-section of the core. Since the change in the cross-sectional size of the core and the change in the mode field size are the same, this is a forward tapered spot size converter.

In the forward tapered converter, the larger the mode field size increased by the expansion, the closer the mode field and the core size would be. As a result, the change in the mode field size will be about the same degree as the change in the core size, thereby facilitating control of the cross-sectional size of the core that gradually changes the mode field size.

Therefore, even when there is a large difference in the cross-sectional size of the core before and after the conversion, limitation in manufacture as in the first technique would not be generated. Hence, the mode field size can be conformed to a general optical fiber with a mode diameter (diameter) of 10 µm.

Although the spot size converter by the second technique includes a gradual vertical taper, a formation technique of such vertical taper cannot be used in some cases. Then, there is a structure suggested that is capable of expanding/reducing the mode field size in the thickness direction only by creating a taper in the vertical direction without forming the vertical taper.

Non-patent literature 2 (hereinafter referred to as a third technique) discloses a spot size converter that expands a core size without hardly changing a refractive index of material forming a core in a similar manner as the spot size converter according to the second technique.

The spot size converter according to the third technique adds a twist to the method of expanding the cross-sectional size of the core from a thin wire waveguide side. The structure formed by vertically stacking tapers with only its width gradually changing can change not only the horizontal size of the mode field but also the vertical size thereof.

In a part where the upper tapered structure is sufficiently thin, most mode field of the guided light is distributed inside the lower tapered structure, thus it is possible to avoid a sudden change in the mode field size even with a sudden step in the thickness direction. As a sudden change in the height of the structure can he created, the formation technique of the tapered structure in the thickness direction is not necessary.

However, the second and third techniques have a common issue. The issue is that the effective refractive index of the guided light cannot be largely changed as the refractive indices of the material forming the first and second cores are almost the same. For example, when the first core is silicon, the second core is also silicon.

In the case of expansion in the core size with such refractive index of silicon, the effective refractive index of the guided light will he about 3.5 of the refractive index of the silicon. Meanwhile, the effective refractive index of guided light in general optical fibers for communication is about 1.5, and simply connecting the spot size converter to this optical fiber will reduce the optical coupling efficiency clue to interface reflection.

Anti-reflective coating on an endface of the waveguide of the optical circuit suppresses the reflection but it is not suitable for high-volume manufacturing. This is because each one of optical circuit chips must be applied with the anti-reflective coating, thereby not reducing the production cost by high-volume manufacturing. The same problem arises when the anti-reflective coating is applied on the side of optical fibers instead of the optical circuit chips.

As stated above, the spot size converters according to the first to third techniques have issues including the limitation of the maximum expandable size of the mode field and necessity of anti-refractive coating. However, the spot size converters can at least establish optical coupling between the waveguide of the optical circuit and the optical fiber.

CITATION LIST

Patent Literature

Patent literature 1: Japanese Unexamined Patent Application Publication No. 2007-93743
Non-patent literature 1: T. Shoji, et al., "Low loss mode size converter from 0.3 µm square Si wire waveguides to single-mode fibres", Electronics Letters, Vol. 38, No. 25, pp. 1669-1670 (2002).
Non-patent literature 2: D. Dai, S. He, and H.-K. Tsang, "Bilevel mode converter between a silicon nanowire waveguide and a larger waveguide", Journal of Lightwave Technology, Vol. 24, No. 6, pp. 2428-2433 (2006).

SUMMARY OF INVENTION

Technical Problem

The first to third techniques can at least optically couple the silicon thin wire waveguide and the optical fiber, ignoring some conditions, however the first to third techniques cannot use a complete optical conversion element (spot size converter) capable of highly efficient optical coupling between the silicon thin wire waveguide and the optical fiber with 10 μm diameters without requiring the anti-reflective coating.

An objective of the present invention is made in light of the issues in the above Background Art and is to realize an optical conversion element and an optical conversion element manufacturing method capable of highly efficient optical coupling with a general optical fiber without requiring anti-reflective coating.

Solution to Problem

The present invention is made to solve the above problems and provides an optical conversion element that includes a waveguide structure having at least both of an innermost core and a first outer core, in which the first outer core is outside the innermost core. The innermost core is an inverse tapered type that has a cross-section area gradually decreasing toward a direction to which a mode field expands along a guided direction, and the first outer core includes a ridge and is a forward tapered type that has a cross-section area gradually increasing toward the direction to which the mode field expands along the guided direction, and thereby converting the mode field of guided light.

The present invention is made to solve the above problems and provides an optical conversion element that includes a waveguide structure including at least both of an innermost core and a first outer core, in which the first outer core is outside the innermost core. The waveguide structure includes the innermost core, the first outer core, lower cladding, and upper cladding, the innermost core is composed of a thin wire core that is disposed on the lower cladding, the first outer core includes a slab layer that buries therein the thin wire core and is disposed on the lower cladding and a ridge that is disposed on the slab layer and is positioned above the thin wire core, the upper cladding buries therein the ridge and is disposed on the slab layer, a refractive index of material forming the thin wire core is greater than a refractive index of material forming the slab layer, a refractive index of material forming the slab layer is greater than or equal to a refractive index of material forming the ridge, and the refractive index of the material forming the ridge is greater than a refractive index of material forming the lower cladding and a refractive index of material forming the upper cladding, a distance from an upper surface of the lower cladding to an upper surface of the ridge is almost constant with fluctuation in a range of thickness of the thin wire core along a length direction of a waveguide, the optical conversion element includes a first tapered part with a cross-sectional area of the thin wire core gradually decreasing in a direction to which the mode field expands along a guided direction, and the optical conversion element includes a second tapered part with a width in an upper part of the ridge gradually increasing in the direction to which the mode field expands along the guided direction, thereby converting the mode field of guided light.

A cross-sectional shape of the ridge vertical to the guided direction may be a rectangular.

The second tapered part may be disposed to a side of the first tapered part where the cross-sectional area of the thin wire core is small.

The first tapered part and the second tapered part may be partially superimposed.

The cross-sectional shape of the ridge vertical to the guided direction may be convex.

A cross-sectional shape of the slab layer vertical to the guided direction may be convex, and width of an upper surface of a projected part in the convex may be same as width of a bottom surface of the ridge.

A cross-sectional area of the thin wire core gradually may decrease in the direction of expanding the mode field along the guided direction in a range of the second tapered part.

The refractive index of the material forming the slab layer may he greater than the refractive index of the material forming the ridge.

The refractive index of the material forming the slab layer may be greater than the refractive index of the material forming the ridge by 0 to 0.3%

The innermost core may be formed of a semiconductor.

The semiconductor may be silicon.

The first outer core may be formed of a silicon compound or polymer.

The silicon compound may be one of silicon dioxide, silicon nitride, silicon oxynitride, phosphorus-silica glass, boron-phosphorus-silica glass, and germanium-silica glass.

The present invention is made to solve the above problems and provides an optical conversion element manufacturing method that includes forming a waveguide structure including at least both of an innermost core and a first outer core, in which the first outer core is outside the innermost core, forming the innermost core into a reverse tapered type with a cross-sectional area gradually decreasing in a direction to which a mode field expands along a guided direction, and forming the first outer core into a forward tapered type that includes a ridge and a cross-sectional area gradually increasing in the direction to which the mode field expands along the guided direction.

The first outer core is connected to a second thin wire core at a connection end side with an optical fiber, material of the second thin wire core has a same or almost same refractive index and width as the refractive index and width of the material forming the ridge of the first outer core, and a cross-section of the second thin wire core is rectangular or almost rectangular.

Advantageous Effects of Invention

As the present invention enables highly efficient optical coupling between the optical circuit and the optical fiber on the substrate, performance of the device and the system including the optical circuit can be improved. Further, the present invention easily achieves high optical coupling efficiency, thereby facilitating the connection process and greatly improving workability. Moreover, as anti-reflective coating is not necessary for each chipped waveguide end, the productivity dramatically improves.

DESCRIPTION OF EMBODIMENTS

An optical conversion element according to the present invention is explained hereinafter based on exemplary embodiments and examples with reference to the drawings.

First Exemplary Embodiment

Figure 1:
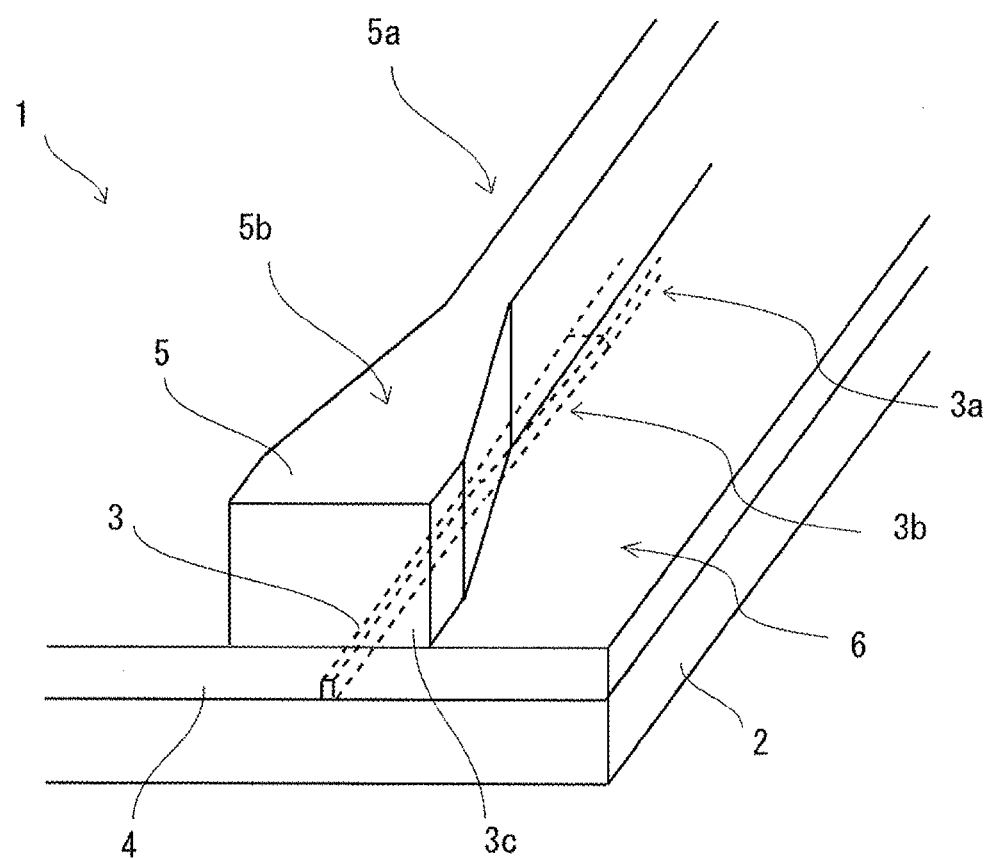
FIG. 1 is a perspective diagram of an optical conversion element according to a first exemplary embodiment of the present invention.

FIG. 1 is a perspective diagram showing an optical conversion element according to a first exemplary embodiment of the present invention. An optical conversion element 1 shown in FIG. 1 has a waveguide structure as a whole and a shape, a size, and an effective refractive index of a mode field of guided light are converted between both ends of the optical conversion element 1.

Although the waveguide structure of the optical conversion element 1 has a core part, and this core part has at least dual core (in other words, dual or more core) for its function, the optical conversion element 1 according to the first exemplary embodiment is explained with the structure having the minimum dual core, as shown in FIG. 1. In the case of triple or more cores, a third core structure may be added outside the dual core explained below.

An innermost core is a thin wire core 3 between the dual core. Moreover, a first outer core is a ridge core 6 and is composed of a slab 4 and a ridge 5 (note that the ridge 5 and the ridge core 6 are different). The thin wire core 3 is buried in the lower part of the slab layer 4. In FIG. 1, a back side of the drawing is the side with a small mode field, and a front side of the drawing is the side with a large mode field.

The thin wire core 3, which is the innermost core, is an inverse tapered core, and its cross-sectional area gradually decreases toward the large mode field side. Meanwhile, the ridge core 6 of the first outer core is a forward tapered core, and a cross-sectional area of the ridge 5 gradually increases towards the large mode field side.

Although both the inverse tapered structure of the innermost core and the forward tapered structure of the first outer core contribute to expansion of the mode field, there are other exemplary advantages in regard to the effective refractive index of the guided light, respectively. The inverse tapered structure of the innermost core expands the mode field outside the innermost core and enables the effective refractive index of the guided light to approach a value close to the refractive index of the material forming the first outer core from a value close to the refractive index of the material forming the innermost core.

Moreover, the forward taper of the first outer core includes the mode field inside the first outer core, and enables the effective refractive index of the guided light to approach the refractive index of the material forming the first outer core. When the refractive index of the material forming the first outer core and the refractive index of the material forming the core of the optical fiber are conformed, the effective refractive index of both guided light will be almost the same on a connection interface between the optical conversion element and the optical fiber, thereby suppressing interface reflection caused by a difference in the effective refractive indices.

Figure 2A:
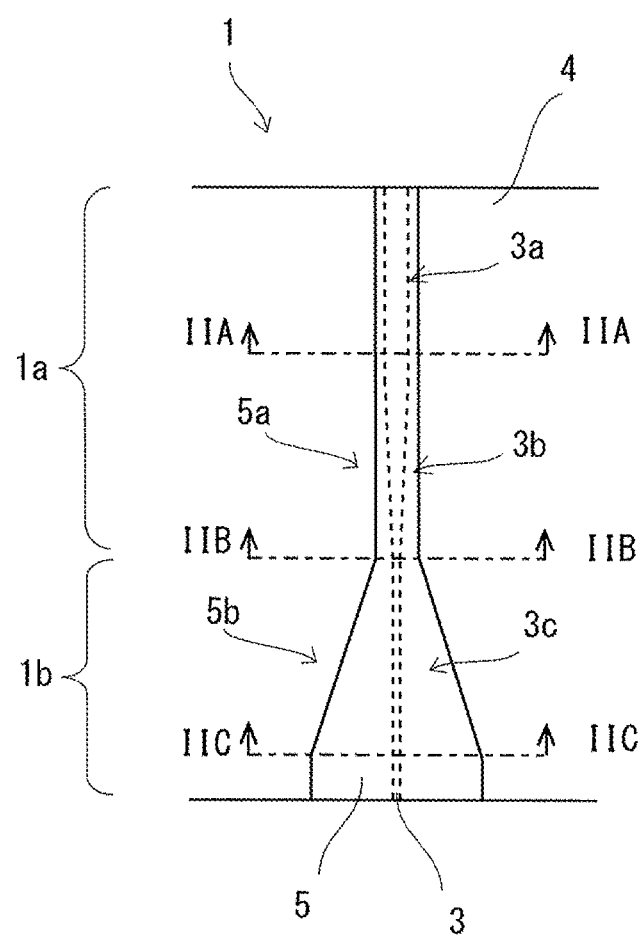
FIG. 2A is a top view of the optical conversion element shown in FIG. 1.
Figure 2B:
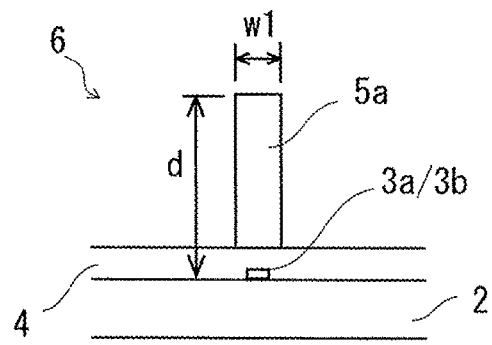
FIG. 2B is a cross-sectional diagram taken along the line IIA-IIA of FIG. 2A.
Figure 2C:
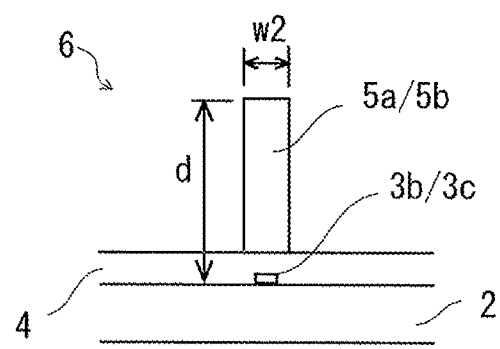
FIG. 2C is a cross-sectional diagram taken along the line IIB-IIB of FIG. 2A.
Figure 2D:
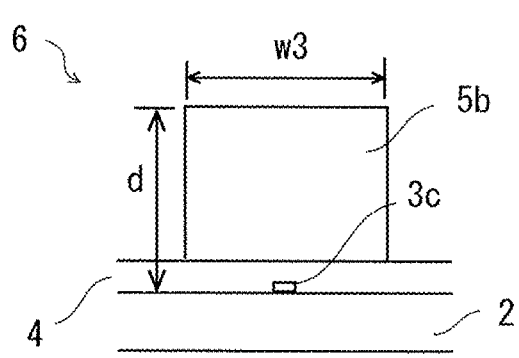
FIG. 2D is a cross-sectional diagram taken along the line IIC-IIC of FIG. 2A.

FIG. 2A is a top view of the optical conversion element shown in FIG. 1. FIG. 2B is a cross-sectional diagram taken along the line IIA-IIA of FIG. 2A. FIG. 2C is a cross-sectional diagram taken along the line IIB-IIB of FIG. 2A. FIG. 2D is a cross-sectional diagram taken along the line IIC-IIC of FIG. 2A. The upper part of the drawing showing the optical conversion element 1 in FIG. 2A is an optical circuit side, and the lower part thereof is an optical fiber side. The structure of the optical conversion element 1 is explained in more detail with reference to FIGS. 2A to 2D.

The optical conversion element 1 includes lower cladding 2, and a thin wire core 3, which is the innermost core and disposed on the lower cladding 2, a slab layer 4, which is a part of the first outer core, buries therein the thin wire core 3, and disposed on the lower cladding 2, a ridge 5, which is a part of the first outer core, disposed on the slab layer 4, and positioned above the thin wire core 3, and upper cladding (not shown), which buries therein the ridge 5 and is disposed on the slab layer 4.

The refractive index of the material forming the thin wire core 3 is greater than the refractive index of the slab layer 4, the refractive index of the slab layer 4 is greater than or equal to the refractive index of the material forming the ridge 5, the refractive index of the material forming the ridge 5 is greater than the refractive index of the material forming the lower cladding 2 and the refractive index of the material forming the upper cladding, and a distance from an upper surface of the lower cladding 2 to an upper surface of the ridge 5 is almost constant across the length direction of the waveguide within the range of the thickness of the thin wire core 2.

The optical conversion element 1 includes a first tapered part 1a in which a cross-sectional area of the thin wire core gradually decreases in the direction to which the mode field expands along a waveguide direction, and a second tapered part 1b in which the width of the upper ridge 5 gradually increases in the direction to which the mode field expands along the waveguide direction.

The lower cladding 2 may be present alone or may be formed on any substrate such as a silicon substrate and a quartz substrate with its material being different from the lower cladding 2.

Although there are no limitations on the cross-sectional shape of the thin wire core 3 such as rectangle, triangle, and semicircle, it is most simply a rectangle. In the range of the first tapered part 1a, the thin wire core 3 includes a large cross-sectional area part 3a, which is the same core as the waveguide of the optical circuit and has the largest cross-sectional area, and a tapered part 3b, with its cross-sectional area decreasing from the optical circuit side toward the optical fiber side.

In FIGS. 2A to 2C, only the width of the tapered part 3b of the thin wire core changes, however when processing can be performed on the thin wire core, not only the width but the thickness may also change. A small cross-sectional area part 3c in the range of the second tapered part 1b of the thin wire core 3 should have a cross-sectional area lower than that of an edge by the optical fiber side of the tapered part 3b.

As explained later, the existence of the small cross-sectional area part 3c generates an exemplary advantage that the mode field expanded inside the ridge core 6 is slightly pulled to the small cross-sectional area part 3c of the thin wire core, and this exemplary advantage can correct distribution of the mode field.

As shown in FIGS. 2B to 2D, the thickness of the lower cladding 2 and the slab layer 4 should only be uniform and it is not necessary to change the thickness in particular. However, there may be some unevenness reflecting the shape of a lower layer structure.

The cross-sectional shape of the ridge 5 is most simply a rectangular but may be other shapes. For example, it may be a trapezoid, a triangle, a semicircle and the like. The cross-sectional shape of the ridge 5 may have some unevenness reflecting the shape of the lower layer structure.

A narrow width part 5a in the range of the tapered part 1a of the ridge 5 has approximately the same degree of thickness as the thickness of the slab layer 4 ("same degree" in this specification means "the same or almost the same"). Moreover, in the cross-section (FIG. 2B) near the middle of the first tapered part 1a (FIG. 2B), and the cross-section (FIG. 2C) on an interface between the first tapered part 1a and the second tapered part 1b, w1 and w2, which are the widths of the ridge 5, may be the same.

The width w3 (FIG. 2D) of the tapered part 5b in the range of the second tapered part 1b of the ridge 5 can be the same degree of the width as a core diameter (diameter) of the optical fiber to be connected at the end of the optical fiber side. As shown in FIG. 2A, the tapered part 5b may also include a part with constant width.

When height d of the ridge core 6 is defined as a sum of the thickness of the slab layer 4 and the ridge 5, the height d is of the same degree as the core diameter (diameter) of the optical fiber at a connection end with the optical fiber. Adjusting w3 and d enables the mode field on an endface of the optical conversion element 1 and the mode field on an endface of the optical fiber to be conformed.

Figure 3A:
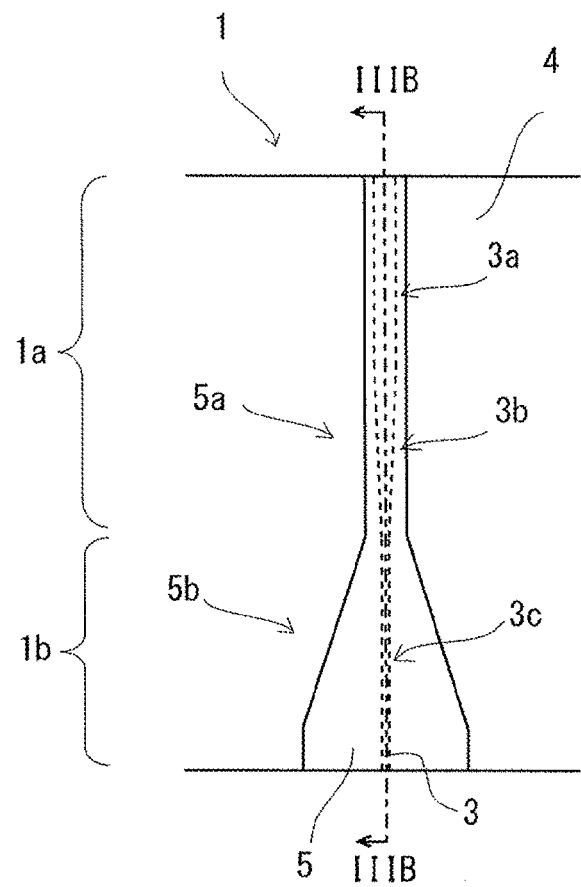
FIG. 3A is a top view of the optical conversion element shown in FIG. 1.
Figure 3B:
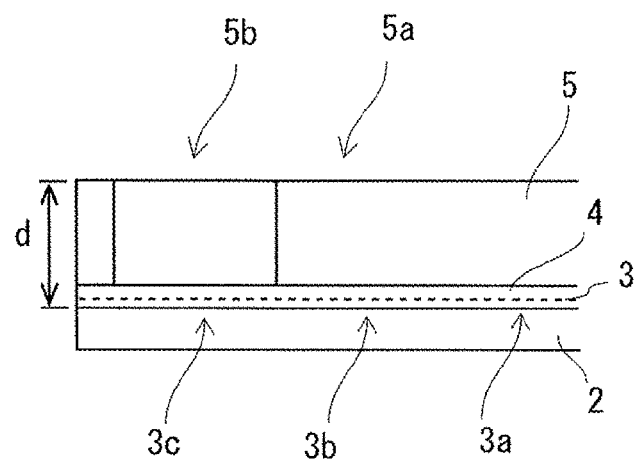
FIG. 3B is a cross-sectional diagram taken along the line IIB-IIB of FIG. 3A.

FIG. 3A is a top view of the optical conversion element shown in FIG. 1. FIG. 3B is a cross-sectional diagram taken along the line IIIB-IIIB of FIG. 3A.

As shown in FIG. 3B, the height d of the ridge core 6 is constant across the entire optical conversion element 1. However, since the slab layer 4 buries therein the thin wire core 3, and the ridge 5 is formed on the slab layer 4, when the slab layer 4 is not planarized in particular, unevenness of about the thickness of the thin wire core 3 is generated, possibly causing a change in the height of the same degree as a result.

Preferably, the height d of the ridge core is increased to be greater than the thickness of the thin wire core 3. This suppresses fluctuation in the height d due to the existence of the thin wire core 3 from influencing the operation of the optical conversion element 1.

The material forming the thin wire core 3 has the greatest refractive index among all components of the optical conversion element 1 including the upper cladding. Therefore, the waveguide structure including the thin wire core 3 as a core is composed.

Moreover, the ridge core 6 composed of the slab layer 4 and the ridge 5 is sandwiched between the lower cladding 2 and the upper cladding including a lower refractive index than the material forming the ridge core 6 except for the thin wire core 3. Therefore, a waveguide structure including the ridge core 6 as a core and upper and lower structures as cladding is composed.

In the optical conversion element 1, not only the mode field is passed between such waveguide structures including the dual core but also each waveguide structure alone converts the mode field size (see the explanation of the exemplary advantage below). Further, as a part of the waveguide structures including the dual core is superimposed, synergistic effect is generated, and thereby smoothing the conversion of the mode field size better than when the waveguide structures are separate.

(Exemplary Advantage of First Exemplary Embodiment)

An operation of the optical conversion element according to the first exemplary embodiment is explained below. In the first tapered part 1a, the mode field expands along the waveguide direction (i.e., toward the waveguide direction) mainly by the exemplary advantage of the inverse tapered structure of the innermost core. However, the greatest size of the mode field expanded by this exemplary advantage is limited by the first outer core with a small core size.

This mechanism provides an exemplary advantage of avoiding excessive and sudden expansion of the cross-sectional area of the mode field. Therefore, the adiabatic change of the mode field is sufficiently generated, and this reduces transmission loss. After the mode field is sufficiently expanded inside the first outer core, the mode field is further expanded by the second tapered part 1b to the size necessary for the mode field.

Note that the term "adiabatic change" is used in the following meaning. In a narrow sense, the "adiabatic change" indicates a change according to an adiabatic process, and the "adiabatic process" is a thermodynamics process without exchange of thermal energy with outside. However, in a broad sense, the term "adiabatic process" or the "adiabatic change" may be used as meaning indicating a more general term "energy" instead of the "thermal energy".

In the present invention, the adiabatic change in the mode field at the time of propagation of light along the tapered structure indicates that a guided mode carrying the energy of the light changes based on a process with no energy exchange with all the other modes (all modes composed of guided mode and radiation mode) or an absorption/amplification process. In other words, the adiabatic change in the mode field is that the mode size and the shape change without an increase or decrease in the optical energy included in the mode field.

As has been mentioned, guaranteeing the adiabatic change in the mode field is important for realizing low loss in the present invention. This is related to that, in the present invention, light propagating along the first outer core is not necessarily limited to a single mode. The relation is explained in detail below. Although the waveguide including the first outer core as a core is not limited to a single-mode waveguide but may include multiple guided modes, even in that case, only the fundamental guided mode includes the mode field closest to the optical fiber at a connection endface with the optical fiber and thereby contributes to highly efficient optical coupling. (This fundamental mode is always included whether the waveguide is the single-mode waveguide or multi-mode waveguide.)

That is, in the optical conversion element of the present invention, even when the waveguide including the first outer core as a core is the multi-mode waveguide, a fundamental operation is that the mode field is expanded or, conversely, reduced only through the fundamental mode. When optical energy splits in the guided mode, which is not the fundamental mode, i.e., the radiation mode or higher-order guided mode, the split optical energy will finally be a cause to generate radiation loss or will be superimposed on the optical energy propagated through the fundamental mode and be a cause to oscillate a transmission spectrum. Therefore, in the process that the light coupled to the fundamental guided mode propagates through the tapered structure, it is necessary to guarantee the adiabatic change in the fundamental guided mode so that there is no energy exchange with the radiation mode or higher-order guided mode.

In order for the mode field of the light in the fundamental guided mode propagating through the tapered structure to adiabatically change, when the light advances by one wavelength within the tapered structure, the change in the mode field size must be small enough to be ignorable as compared to the wavelength (about less than or equal to 1/100). In order to do that, basically the tapered structure is changed as gently as possible, however when the change is unlimitedly gentle, the tapered structure will be too long, thereby generating more transmission loss instead. Hence, as in the present invention, even when the taper is shortened to some extent, the structure is effective that can suppress a sudden change in the mode field.

One of the features of the present invention is that the first outer core is a ridge type, and the width of the ridge is made small in the inverse tapered part of the innermost core. With the sufficiently small width of the ridge, there is an exemplary advantage that the mode field is hardly distributed in the upper ridge but distributed in the vicinity of the innermost core of the lower ridge. When the mode field expands from the innermost core to the first outer core, this exemplary advantage further reduces the danger of the sudden expansion of the mode field.

That is, as the first outer core is a ridge type, it is possible to control the speed of increase/decrease in a core width along the guided direction in larger tolerance than in the case of using an outer core with other cross-sectional structure such as a core with a rectangular cross-section. This consequently produces an exemplary advantage of facilitating manufacture of tapers for exhibiting sufficient performance as an optical conversion element.

The first tapered part and the second tapered part may be partially superimposed. That is, in the case of the first exemplary embodiment, the tapered part of the thin wire core and the tapered part of the ridge may be partially superimposed in the guided direction.

(Modification of First Exemplary Embodiment)

There is no big change in the operation with the structure including slight modification from the first exemplary embodiment. That is explained with reference to FIG. 4. Both FIGS. 4A and 4B are cross-sectional diagrams showing modified structures of the optical conversion element according to the first exemplary embodiment of the present invention.

Figure 4A:
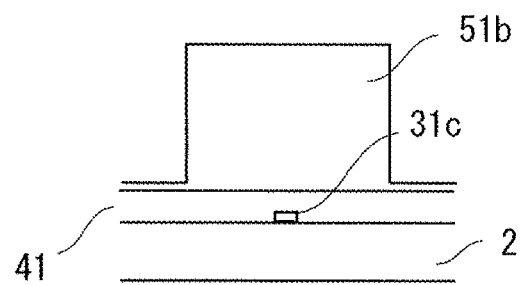
FIG. 4A is a cross-sectional diagram of a modified structure of the optical conversion element according to the first exemplary embodiment of the present invention.

FIG. 4A shows a cross-section of a tapered part 51b of the ridge 5 in the second tapered part 1b (see FIG. 2A) as a modification. As in this modification shown in FIG. 4A, the cross-section of the ridge 5 is not a rectangular but may alone have a convex cross-section structure with thin films on both sides of a bottom part. As described above, FIG. 4A shows the cross-section of the tapered part 51b of the ridge 5 in the second tapered part 1b, and the narrow width part 5a of the ridge 5 in the first tapered part 1a (see FIG. 2A) may also have a convex cross-sectional structure in a similar manner.

Figure 4B:
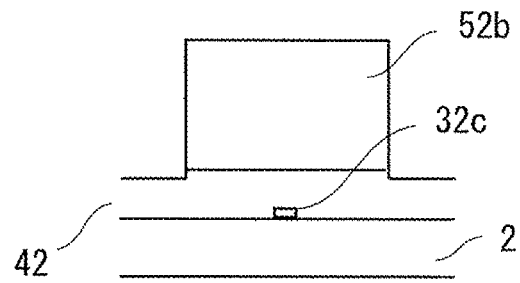
FIG. 4B is a cross-sectional diagram of a modified structure of the optical conversion element according to the first exemplary embodiment of the present invention.

Moreover, FIG. 4B shows the cross-section of a tapered part 52b of the ridge 5 in the second tapered part 1b (see FIG. 2A) as another modification. As in another modification shown in FIG. 4B, the surface of the slab layer 42 is not planar, but the cross-sectional shape vertical to the guided direction is convex, and the width of the upper surface of the projected part in the convex shape may have the same width as the width of the bottom surface of the tapered part 52b. As mentioned above, FIG. 4B shows the cross-section of the tapered part 52b of the ridge 5 in the second tapered part 1b, however the narrow width part 5a of the ridge 5 of the first tapered part 1a (see FIG. 2A) may also have a convex cross-sectional structure in a similar manner.

Although the cross-sectional structure of the ridge shown in FIGS. 4A and 4B may be manufactured intentionally, it is also a structure that possibly appears due to fluctuation in the substrate surface during the process of processing the ridge into the shape shown in FIG. 2D. In any case, the optical conversion element operates with the cross-sectional structures of the ridges shown in FIGS. 4A and 4B in a similar manner as the case with the cross-sectional structure shown in FIG. 2D.

Second Exemplary Embodiment

Next, a second exemplary embodiment of the optical conversion element according to the present invention is explained with reference to the drawings.

Figure 5A:
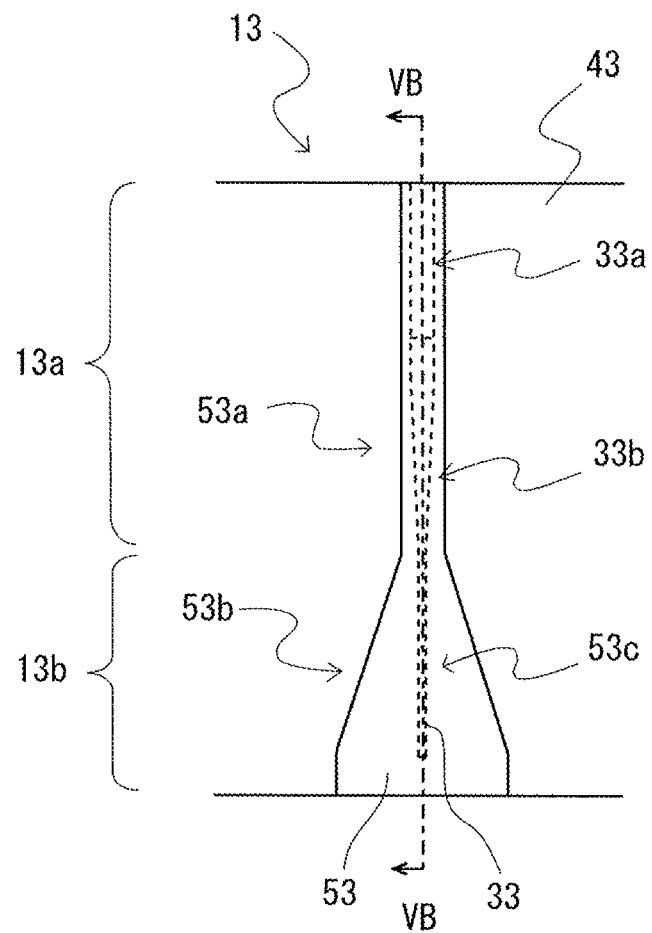
FIG. 5A is a top view of an optical conversion element according to a second exemplary embodiment of the present invention.

FIG. 5A is a top view of the optical conversion element according to the second exemplary embodiment of the present invention. FIG. SB is a cross-sectional diagram taken along the line VB-VB of FIG. 5A.

As for an optical conversion element 13 according to the second exemplary embodiment, although the structure of the first outer core (slab 43 and ridge 53) is almost the same as that of the first exemplary embodiment, the structures of the inner cores are different. As shown in FIG. 5A, in a range of a first tapered part 13a, a thin wire core 33 includes a large cross-sectional area part 33a, which is the same core as the waveguide of the optical circuit and has the largest cross-sectional area, and a tapered part 33b with its cross-sectional area decreasing from the optical circuit side to the optical fiber side. Further, in a range of a second tapered part 13b, a cross-sectional area of a small cross-sectional area part 33c of the thin wire core 33 gradually decreases in the direction to which the mode field expands along the guided direction. That is, the thin wire core 33 has an inverse tapered structure (inverse tapered type) not only in the first tapered part 13a but also in the second tapered part 13b. Note that 53a indicates a narrow width part and 53b indicates a tapered part.

As explained in the first exemplary embodiment, since the small cross-sectional part of the thin wire core 33 is remained in the second tapered part 13b, it is possible to correct the distribution of the mode field expanded inside the first outer core. However, when the second tapered part 13b is excessively long, it may be difficult to keep constant the cross-sectional area of the small cross-sectional area of the thin wire core 33 through the length thereof. Such a case may influence the distribution of the mode field, and thereby fluctuating the optical coupling efficiency of the optical conversion element.

The second exemplary embodiment is effective in the case such a problem occurs. Specifically, as the thin wire core 33 has the forward tapered structure in the second tapered part 13b and the cross-sectional area thereof is eventually reduced to zero, an exemplary advantage is generated that stabilizes the optical coupling efficiency of the optical conversion element.

As shown in FIG. 5A, an end of the small cross-sectional part of the thin wire core 33 may be positioned in the middle of the second tapered part 13b.

Figure 5B:
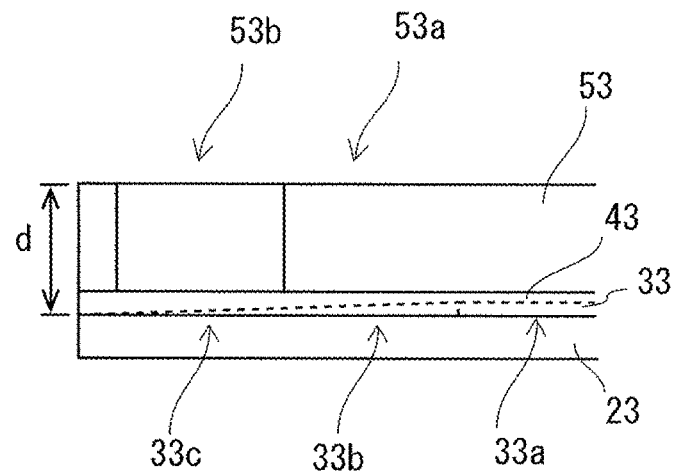
FIG. 5B is a cross-sectional diagram taken along the line VB-VB of FIG. 5A.

Further, as shown in FIG. 5B, the second tapered part 13b of the thin wire core 33 may include a taper in the thickness direction. Furthermore, the second tapered part 13b of the thin wire core 33 may include a taper in the thickness direction that is continuous from the first tapered part 13a. Note that the slab is referred as a slab 23 in FIG. 5B.

Example 1

The present invention is explained in more detail based on an example 1. The specific structure of the optical conversion element according to the present invention was examined by calculation on how the mode field changes. The calculation of the mode field was performed by the finite element method.

As the example 1, a structure was analyzed in which the optical conversion element 1 according to the first exemplary embodiment was created in an optical circuit on an SOI substrate. Structural parameters were that the refractive index of the material forming the lower cladding 2 was 1.452 and the thickness thereof was 3.00 μm, the refractive index of the material forming the thin wire core 3 was 3.480, the refractive index of the material forming the slab layer 4 was 1.496 and the thickness thereof was 2.00 μm, the refractive index of the material forming the ridge 5 was 1.496 and the thickness thereof was 9.5 μm, and the refractive index of the material forming the top cladding was 1.452 and the thickness thereof was 3 μm.

These refractive indices are values when a silicon thermal oxide film of a BOX layer was used as the lower cladding 2, silicon of the SOI layer was used as the thin wire core 3, and germanium-silica glass (GeSG) with an adjustable refractive index was used as the slab layer 4, the ridge 5, and the upper cladding.

Additionally, as for the large cross-sectional area part 3a of the thin wire core 3 continuing from the optical circuit, the width was 400 nm, the thickness was 200 nm. As for the small cross-sectional area part 3c on the optical fiber side, the width was 150 nm and the thickness was 100 nm. Moreover, the width of the ridge 5a was 2.0 μm, and the width of the part with the largest cross-sectional area of the ridge tapered part 5b was 12 μm.

FIGS. 6A, 6B, 7A, 7B, 8A and 8B are schematic diagrams, in regard to the optical conversion element 1 according to the example 1 of the present invention, including contour plots (dashed lines) of mode fields of guided light on the cross-sections shown in FIGS. 2B to 2D superimposed on the cross-sectional diagram (solid lines) of the optical conversion element.

Figure 6A:
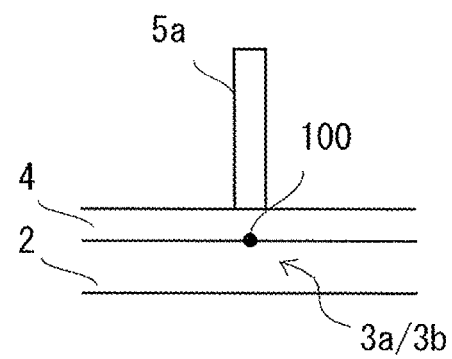
FIG. 6A is a schematic diagram including a contour plot of a mode field of guided light in TE mode on the cross-section of FIG. 2B superimposed on the cross-sectional diagram of the optical conversion element 1.
Figure 6B:
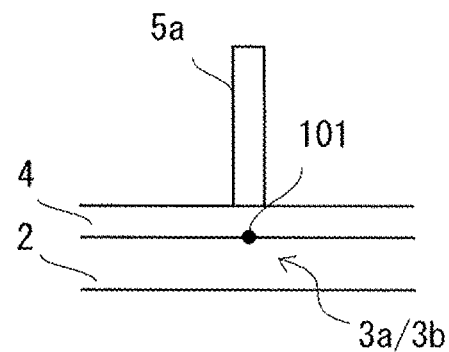
FIG. 6B is a schematic diagram including a contour plot of a mode field of guided light in TM mode on the cross-section of FIG. 2B superimposed on the cross-sectional diagram of the optical conversion element 1.
Figure 7A:
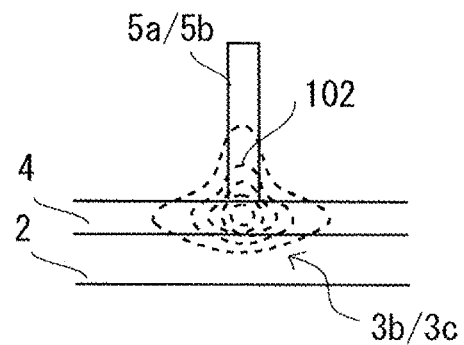
FIG. 7A is a schematic diagram including a contour plot of a mode field of guided light in TE mode on the cross-section of FIG. 2C superimposed on the cross-sectional diagram of the optical conversion element 1.
Figure 7B:
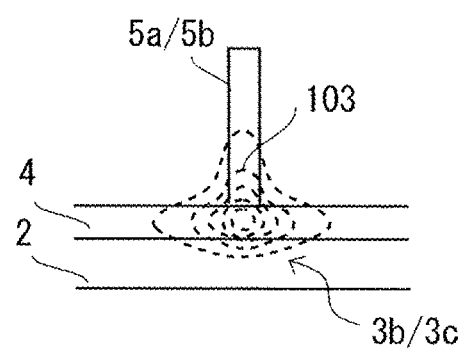
FIG. 7B is a schematic diagram including a contour plot of a mode field of guided light in TM mode on the cross-section of FIG. 2C superimposed on the cross-sectional diagram of the optical conversion element 1.
Figure 8A:
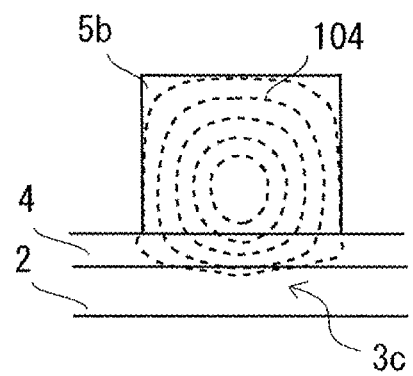
FIG. 8A is a schematic diagram including a contour plot of a mode field of guided light in TE mode on the cross-section of FIG. 2D superimposed on the cross-sectional diagram of the optical conversion element 1.
Figure 8B:
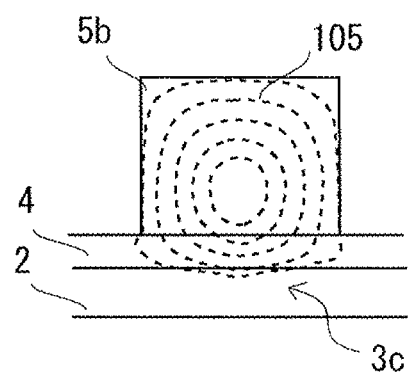
FIG. 8B is a schematic diagram including a contour plot of a mode field of guided light in TM mode on the cross-section of FIG. 2D superimposed on the cross-sectional diagram of the optical conversion element 1.

FIG. 6A is the schematic diagram including the contour plot of the mode field of the guided light in the TE mode on the cross-section of FIG. 2B superimposed on the cross-sectional diagram of the optical conversion element 1. FIG. 6B is the schematic diagram including the contour plot of the mode field of the guided light in the TM mode on the cross-section of FIG. 2B superimposed on the cross-sectional diagram of the optical conversion element 1. FIG. 7A is the schematic diagram including the contour plot of the mode field of the guided light in the TE mode on the cross-section of FIG. 2C superimposed on the cross-sectional diagram of the optical conversion element 1. FIG. 7B is the schematic diagram including the contour plot of the mode field of the guided light in the TM mode on the cross-section of FIG. 2C superimposed on the cross-sectional diagram of the optical conversion element 1. FIG. 8A is the schematic diagram including the contour plot of the mode field of the guided light in the TE mode on the cross-section of FIG. 2D superimposed on the cross-sectional diagram of the optical conversion element 1. FIG. 8B is the schematic diagram including the contour plot of the mode field of the guided light in the TM mode on the cross-section of FIG. 2D superimposed on the cross-sectional diagram of the optical conversion element 1.

However, in this specification, the guided light in the TE mode indicates the guided light with its main electric field component being parallel to the substrate, and the guided light in the TM mode indicates the guided light with its main electric field component being vertical to the substrate. Explanation is given here with reference to FIGS. 1, 2A to 2D, and 3A and 3B not only FIGS. 6A, 6B, 7A, 7B, 8A, and 8B.

As shown in FIGS. 6A and 6B respectively, most of the mode field 100 in the TE mode and the mode field 101 in the TM mode remained inside the thin wire core 3.

As shown in FIGS. 7A and 7B, in the interface between the first tapered part 1a and the second tapered part 1b where the cross-section of the thin wire core 3 is sufficiently small, both the mode field 102 in the TE mode and the mode field 103 in the TM mode expanded locally inside the ridge core (indicated by the interface 5a/5b between the narrow width part and the tapered part of the ridge in FIGS. 7A and 7B).

Especially noted is that the mode field concentrated near the connection part between the ridge 5 and the slab layer 4 in the interface 5a/5b between the narrow width part and the tapered part of the ridge, and hardly distributed in the upper part of the ridge. The reason for this is explained based on an approach of equivalent index method. When the width of the ridge 5 is small enough in the interface 5a/5b of the narrow width part and the tapered part of the ridge, most field leaks in the upper cladding surrounding the ridge 5 and is distributed.

Note that the equivalent index method is a method to apply an effective refractive index calculated assuming that, on a slab waveguide including a slab (plate) as a core, when thickness and a refractive index of the slab varies depending on the position, refractive index distribution identical to refractive index distribution in the thickness direction at a certain position on the slab including cladding expands unlimitedly in the horizontal direction as a local refractive index sensed by transmitted light at the certain position. With this method, when the refractive index distribution and thickness distribution of the slab waveguide change depending on the position, the problem can be simplified in a two-dimensional model with the equivalent index being distributed two-dimensionally.

As a result, in the interface 5a/5b between the narrow width part and the tapered part of the ridge, the local average refractive index of the material sensed by the field above the ridge 5 approaches the refractive index of the material forming the upper cladding. As the local average refractive index was lower than the local average refractive index of the material sensed by the field near the connection part between the ridge 5 and the slab layer 4, the mode field concentrated near the connection part with a greater refractive index. This mechanism is the same as the mechanism in which the field distributed in the slab layer concentrates in the vicinity of the ridge 5.

As shown in FIGS. 8A and 8B, on the optical fiber side of the second tapered part 1b (see FIG. 2A), the mode field 102 in the TE mode and the mode field 103 in the TM mode sufficiently expanded inside the tapered part 5b of the ridge.

This reason is contrary to the abovementioned case of the narrow width part 5a of the ridge. Specifically, as the width of the ridge is sufficiently wide (at the tapered part 5b of the ridge), penetration of the field into the upper cladding becomes small, and the local average refractive index of the material sensed by the field inside the tapered part 5b of the ridge approaches the refractive index of the material forming the ridge 5.

Since the local average refractive index was greater than the local average refractive index of the material sensed by the field near the connection part between the ridge 5 and the slab layer 4, the mode field was distributed centering on the tapered part 5b of the ridge with a large local average refractive index.

Figure 9A:
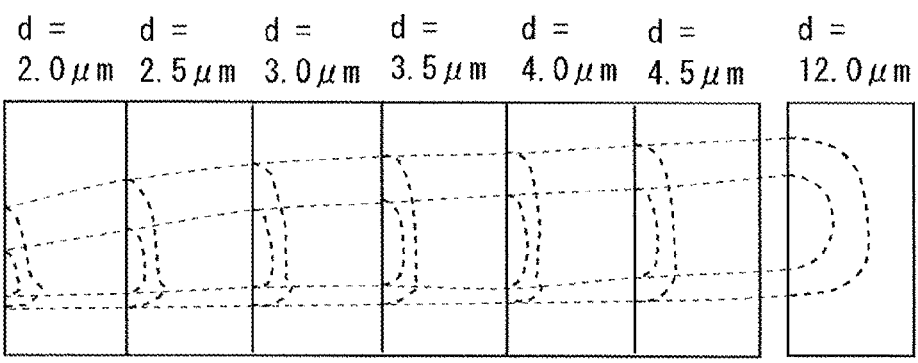
FIG. 9A is a transition diagram of multiple schematic diagrams including contour plots (dashed line) of fields for explaining an exemplary advantage of a small area part of a thin wire core 3 according to an example 1 of the present invention superimposed on a cross-sectional diagrams (solid line) of the optical conversion element when the small area part of the thin wire core 3 is removed.
Figure 9B:
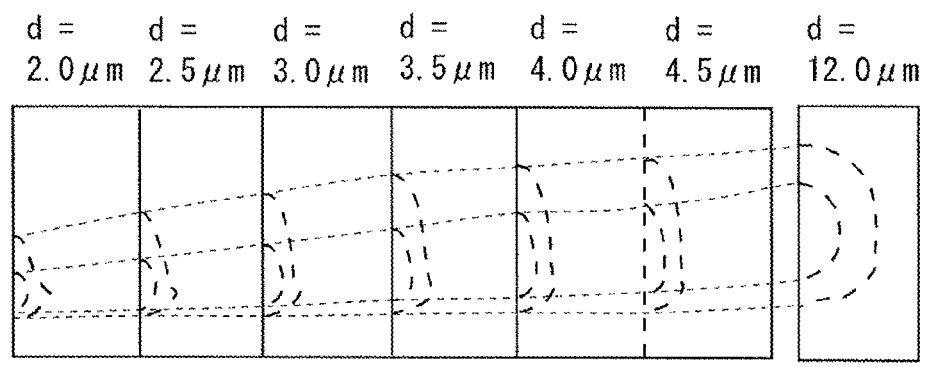
FIG. 9B is a transition diagram of multiple schematic diagrams including contour plots (dashed line) of fields for explaining an exemplary advantage of a small area part of a thin wire core 3 according to the example 1 of the present invention superimposed on a cross-sectional diagrams (solid line) of the optical conversion element when the small area part of the thin wire core 3 remains.

Next, an examination was performed on a correction effect of the mode field by the small area part of the thin wire core 3 remained in the range of the second tapered part 1b. FIG. 9A is transition diagram of multiple schematic diagrams including contour plots (dashed line) of fields for explaining the exemplary advantage of the small area part of the thin wire core 3 according to the example 1 of the present invention superimposed on the cross-sectional diagrams (solid line) of the optical conversion element when the small area part of the thin wire core 3 is removed. FIG. 9B is transition diagram of multiple schematic diagrams including contour plots (dashed line) of fields for explaining the exemplary advantage of the small area part of the thin wire core 3 according to the example 1 of the present invention superimposed on the cross-sectional diagrams (solid line) of the optical conversion element when the small area part of the thin wire core 3 remains.

In both FIGS. 9A and 9B, right halves of the contour plots (dashed line) of the mode fields that were calculated with changing width d of the ridge 5 are arranged in order, and the points with the same strength ratio in the mode fields were connected by dotted lines. Each mode field was standardized by the maximum strength.

In comparison of FIGS. 9A and 9B, it was confirmed that the speed of mode field expansion according to the increase in the width d of the ridge 5 was slower in the case where the small area part of the thin wire core 3 remains than in the case where the small area part of the thin wire core 3 is removed. With the result, it was confirmed that the remained small area part of the thin wire core 3 has an exemplary advantage of further smoothing the change of the mode field to the width d of the ridge.

Transmission of the optical conversion element according to the example 1 was calculated by the finite-difference time-domain method. The parameters of the cross-sectional structure of the optical conversion element were the same as the parameters used for calculation of the mode field. As for the length, the first tapered part was 0.4 mm and the second tapered part was 1.2 mm.

As a result of the calculation, the transmission loss at the wavelength of 1.55 μm was 0.3 dB in both TE mode and TM mode. When the optical conversion element was too short, the guided mode did not adiabatically change along the length direction. However when the length was greater than or equal to 1 mm, the transmission loss less than or equal to 0.3 dB can be obtained.

Further examined was an optical loss on the connection interface when the optical conversion element 1 and the optical fiber were butt coupled. This loss is composed of a loss resulting from a difference in the shapes or sizes of the mode fields, and a reflective loss resulting from a difference in the effective refractive indices. An optical coupling loss by butt coupling of the optical conversion element and an optical fiber with a mode diameter of 10 μm calculated by the finite-difference time-domain method was 0.1 dB in both the TE and TM modes.

Of these, a value occupied by the reflective loss was estimated. When propagating light is a plane wave, reflectivity of an interface between a medium with an effective refractive index of propagating light being n1 and a medium with an effective refractive index of propagating light being n2 can be calculated by a square of:

$$|(n1-n2)/(n1+n2)|$$

When the mode field of the guided light is close to the plane wave, the reflection at the connection interface can be estimated by the same formula.

The effective refractive indices of the guided light were calculated by the finite element method. In the waveguide from the optical circuit, the effective refractive indices of the guided light in TE and TM mode are respectively 2.223 and 1.709, while in the endface on the optical fiber side of the optical conversion element according to the first embodiment, they were both 1.491 in TE and TM mode. Since the effective refractive index of the guided light of the optical fiber was 1.454, when the waveguide and the optical fiber of the optical circuit were directly joined, the loss by the reflection at the interface was calculated as 4.4% (−14 dB) in the TE mode and 0.5% (−23 dB) in the TM mode.

Meanwhile, when the optical conversion element 1 according to the example 1 was created at a waveguide end of the optical circuit, the effective refractive index was 0.016% (−38 dB) in both TE and TM modes. In practice, the size of the reflection is desirably less than or equal to −30 dB, and the optical conversion element according to the example 1 was confirmed to sufficiently satisfy the condition.

The total loss of the optical conversion element in the case of optical coupling with the optical fiber having a core diameter of 10 μm was 0.4 dB, totaling the transmission loss of 0.3 dB and the reflective loss of 0.1 dB. The size of this loss was a small enough value as coupling loss between the silicon waveguide and the optical fiber.

In the case of the example 1, the refractive index of the material forming the slab layer 4 was conformed to that of the material forming the ridge 5. This has an exemplary advantage of simplifying the formation process of the slab layer 4 and the ridge 5. Specifically, common material between the slab layer 4 and the ridge 5 may be formed at a time, a resist mask of the pattern of the ridge 5 may be formed, and then etching may be performed for the thickness of the ridge 5.

On the other hand, in an example 2 below, the refractive indices of the material forming the slab layer 4 and the ridge 5 are different. When the refractive indices of the material forming the slab layer 4 and the ridge 5 differ, material forming the slab layer 4 and the ridge 5 must be deposited separately. However, another exemplary advantage is being capable of reducing the difficulty of the etching processing.

Example 2

A cross-sectional structure of the optical conversion element according to the second example is almost the same as that according to the example 1. A difference from the example 1 is that the refractive index of the material forming the slab layer 4 remained as 1.496, however the refractive index of the material forming the ridge 5 was 1.493, which was lower by 0.2% than that of the slab layer 4.

Then, the mode field distributed in the ridge core 6 is distributed slightly biased to the slab layer 4. This consequently generates an exemplary advantage that even when the width of the interface 5a/5b between the narrow width part 5a and the tapered part 5b of the ridge is greater than the case of the example 1, the mode field can concentrate.

Figure 10A:
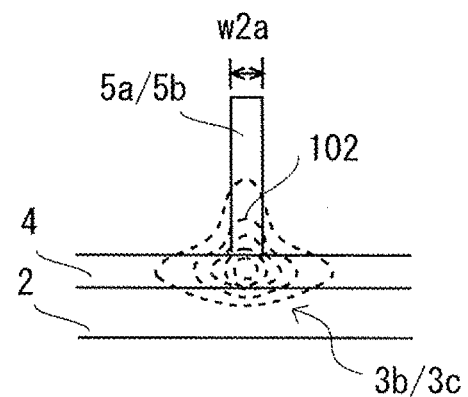
FIG. 10A is a schematic diagram including a contour plot (dashed line) of a mode field of guided light superimposed on a cross-sectional diagram (solid line) of an optical conversion element according to the example 1 of the present invention.
Figure 10B:
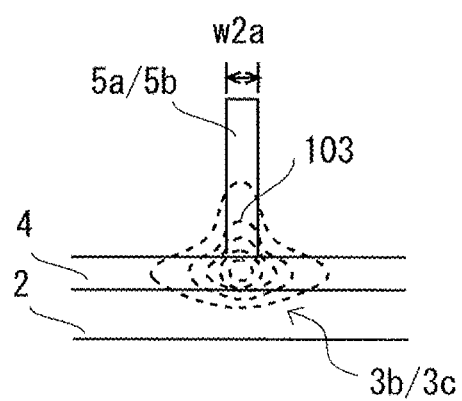
FIG. 10B is a schematic diagram including a contour plot (dashed line) of a mode field of guided light superimposed on the cross-sectional diagram (solid line) of the optical conversion element according to the example 1 of the present invention.
Figure 11A:
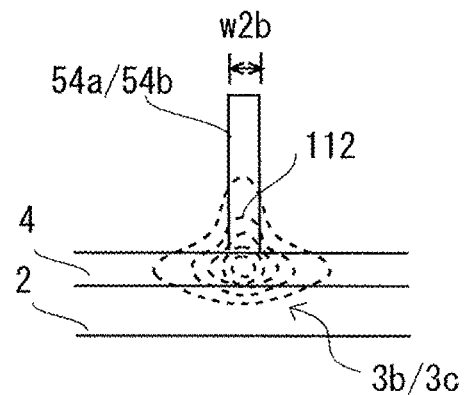
FIG. 11A is a schematic diagram including a contour plot (dashed line) of a mode field of guided light superimposed on a cross-sectional diagram (solid line) of an optical conversion element according to an example 2 of the present invention.
Figure 11B:
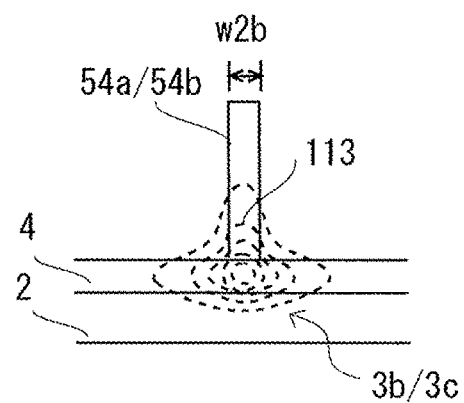
FIG. 11B is a schematic diagram including a contour plot (dashed line) of a mode field of guided light superimposed on the cross-sectional diagram (solid line) of the optical conversion element according to the example 2 of the present invention.

This exemplary advantage is further explained with reference to FIGS. 10A and 10B. FIGS. 10A and 10B are schematic diagrams including contour plots (dashed line) of mode fields of guided light superimposed on the cross-sectional diagram (solid line) of the optical conversion element according to the example 1 of the present invention. FIGS. 11A and 11B are schematic diagrams including contour plots (dashed line) of mode fields of guided light superimposed on the cross-sectional diagram (solid line) of the optical conversion element according to the example 2 of the present invention.

FIG. 10A is the same as FIG. 7A according to the example 1.

FIG. 10B is the same as FIG. 7B according to the example 1.

FIG. 11A is a schematic diagram including the contour plot of the mode field of the guided light in the TE mode according to the example 2 at a position on the same cross-section as FIG. 10A superimposed on the cross-sectional diagram of the optical conversion element. FIG. 11B is a schematic diagram including the contour plot of the mode field of the guided light in the TM mode according to the example 2 at a position on the same cross-section as FIG. 10B superimposed on the cross-sectional diagram of the optical conversion element.

In FIGS. 10A and 10B according to the example 1, a width w2a of the interface 5a/5b between the narrow width part and the tapered part of the ridge was 2.0 μm. While in FIGS. 11A and 11B, a width w2b of the interface 5a/5b between the narrow width part and the tapered part of the ridge was 2.5 μm, thus w2b was greater than w2a by 0.5 μm.

Nevertheless, the mode field 102 (TE mode) and the mode field 103 (TM mode) in the case the width of the ridge was 2.0 μm have almost the same distribution respectively as the mode field 112 (TE mode) and the mode field 113 (TM mode) when the ridge width was 2.5 μm.

As has been explained, slightly reducing the refractive index of the material forming the ridge 5 than that of the slab layer 4 enabled an increase in the minimum width of the ridge 5.

Although w2b was greater than w2a by only 0.5 μm, this has a great exemplary advantage for processing the ridge 5. As the thickness of the ridge was 9.5 μm, which is large, in both examples 1 and 2, a photoresist pattern used for etching the photoresist pattern is desirably as thick as possible. The width of 2.5 μm has less risk of resist pattern collapse than the width of 2.0 μm, thereby producing an exemplary advantage of allowing usage of a photoresist with the thickness of 1.25 times.

The lower the refractive index of the ridge 5 as compared to the refractive index of the material forming the slab layer 4, the greater the exemplary advantage by the slab layer 4 to pull the mode field. However, excessively large refractive index of the material forming the slab layer 4 and the ridge would exceedingly increase the bias of the mode field toward the slab layer 4, and the mode field would largely deviate from the mode field of the optical fiber.

In this regard, an appropriate refractive index difference was examined. A result of calculating the optical coupling efficiency with several refractive index differences has revealed that when the refractive index of the material forming the ridge is lower than the refractive index of the material forming the slab layer in the range of 0 to 0.3%, the width of the narrowest part of the ridge can be increased without deteriorating the optical coupling efficiency.

Although the optical conversion element according to the present invention has been explained based on the exemplary embodiments and examples, it is obvious that the present invention is not limited to such exemplary embodiments and examples, but there are various exemplary embodiments and examples within the range of technical matters described in claims.

For example, the material forming the innermost core is not limited to silicon but may be other material as long as the material has a high refractive index. As semiconductor material other than silicon, germanium and compound semiconductor may be used, for example.

There are no limitations also in the material forming the first outer core. For example, a silicon compound and polymer may be used. As long as the material forming the first outer core is a silicon compound, the material may be any one of silicon dioxide, silicon nitride, silicon oxynitride, phosphorus-silica glass, and boron-phosphorus-silica glass.

Moreover, although the above explanation is mainly focused on the case in which the innermost core is a thin wire core, the thin wire core may further be connected to a ridge core or a core having other shapes toward inside the optical circuit.

Further, a purpose of the optical conversion element according to the present invention is not limited for optical coupling between a waveguide from the optical circuit and an optical fiber. For example, the optical conversion element according to the present invention may be used for optical coupling between a waveguide other than the optical fiber and an optical conversion element mounted on other optical circuits.

Furthermore, the optical conversion element according to the present invention may be used for optical coupling with an optical element that is not either a waveguide or an optical conversion element. For example, the optical conversion element according to the present invention may be used for optical coupling with a polarizer. In that case, the optical conversion elements according to the present invention are disposed face-to-face with a predetermined gap therebetween, and an optical element including a polarizer may be inserted between the optical conversion elements.

The structure in which the optical element is sandwiched by the optical conversion elements according to the present invention may be inserted inside an optical circuit, not only at an end of the circuit or a chip end. Specifically, the optical conversion element according to the present invention may not only be mounted on an input and output end but inserted inside the optical circuit.

Further, the first outer core may further be connected to a thin wire core with no slab that is formed of material with substantially the same refractive index at the connection end side with the optical fiber. That is, both the refractive index and the width of the material are the same or almost the same as those of the ridge of the first outer core, and the first outer core may be connected to the second thin wire core with its cross-section being a square or almost square at the connection end with the optical fiber. With such a structure, the shape of the mode field for the optical conversion element can be further close to that of the optical fiber at the connection part between the optical conversion element according to the present invention and the optical fiber, thereby further reducing coupling loss.

In that case, although the best structure is that the first outer core has a tapered structure and the thickness of the slab layer gradually decreased within a certain distance, the slab may suddenly end. This is because that as the thickness of the slab is small as compared to the entire structure of the first outer core, a sudden disappearance of the slab at the connection part may not largely influence the shape of the mode field. Note that in the tapered structure, when the width of the slab layer gradually narrows in a certain distance and reaches the same or almost the same width as the ridge, the same exemplary advantage can be achieved.

Moreover, the first outer core may be buried further in second or more outer cores. The size of the mode field may further be expanded by using the second or more outer core.

Note that the optical conversion element according to the present invention operates contrary. That is, the optical conversion element also operates in the opposite direction. Accordingly, it is obvious that the optical conversion element according to the present invention not only expands light from the waveguide of the optical circuit but conversely reduces the light from outside such as from an optical fiber and enables the light to enter the optical circuit.

INDUSTRIAL APPLICABILITY

Since the optical conversion element has the structure as above, it can be applied especially to an optical conversion element for realizing highly efficient optical coupling between a thin wire waveguide including a medium with a high refractive index as a core and a single-mode optical fiber for optical communication.

Although the present invention has been explained with reference to the exemplary embodiments, the present invention is not limited by above. Various modifications that can be understood by a person skilled in the art can be made to the configuration and details of the present invention within the scope of the invention.

The present application claims priority rights of and is based on Japanese Patent Application No. 2010-228086 filed on Oct. 8, 2010 in the Japanese Patent Office, the entire contents of which are hereby incorporated by reference.

REFERENCE SIGNS LIST 1 and 13 OPTICAL CONVERSION ELEMENT
1a and 13a FIRST TAPERED PART
1b and 13b SECOND TAPERED PART
2 and 23 LOWER CLADDING
3 and 33 THIN WIRE CORE
3a and 33a LARGE CROSS-SECTIONAL AREA PART OF THIN WIRE CORE
3b and 33b TAPERED PART OF THIN WIRE CORE
3c, 31c, 32c, and 33c SMALL CROSS-SECTIONAL AREA PART OF THIN WIRE CORE
3a/3b INTERFACE BETWEEN LARGE CROSS-SECTIONAL AREA PART AND TAPERED PART OF THIN WIRE CORE
3b/3c INTERFACE BETWEEN TAPERED PART OF THIN WIRE CORE AND SMALL CROSS-SECTIONAL AREA PART
4, 41, 42, and 43 SLAB LAYER
5 and 53 RIDGE
5a and 53a NARROW WIDTH PART OF RIDGE
5b, 51b, 52b, and 53b TAPERED PART OF RIDGE
5a/5b INTERFACE BETWEEN NARROW WIDTH PART OF RIDGE AND TAPERED PART
6 RIDGE CORE
100, 101, 102, 103, 104, 105, 112, and 113 CONTOUR PLOT OF MODE FIELD

The invention claimed is:

1. An optical conversion element comprising a waveguide structure including at least both of an innermost core and a first outer core, the first outer core being outside the innermost core, wherein
the waveguide structure includes the innermost core, the first outer core, lower cladding, and upper cladding,
the innermost core is an inverse tapered type that has a cross-section area gradually decreasing toward a direction to which a mode field expands along a guided direction,
the first outer core includes a ridge and is a forward tapered type that has a cross-section area gradually increasing toward the direction to which the mode field expands along the guided direction, thereby converting the mode field of guided light, and
the innermost core is composed of a thin wire core that is disposed on the lower cladding,
the first outer core includes a slab layer that buries therein the thin wire core and is disposed on the lower cladding and a ridge that is disposed on the slab layer and is positioned above the thin wire core,
the upper cladding buries therein the ridge and is disposed on the slab layer, and
a refractive index of material forming the thin wire core is greater than a refractive index of material forming the slab layer, a refractive index of material forming the slab layer is greater than or equal to a refractive index of material forming the ridge, and the refractive index of the material forming the ridge is greater than a refractive index of material forming the lower cladding and a refractive index of material forming the upper cladding.

2. An optical conversion element comprising a waveguide structure including at least both of an innermost core and a first outer core, the first outer core being outside the innermost core, wherein the waveguide structure includes the innermost core, the first outer core, lower cladding, and upper cladding, the innermost core is composed of a thin wire core that is disposed on the lower cladding, the first outer core includes a slab layer that buries therein the thin wire core and is disposed on the lower cladding and a ridge that is disposed on the slab layer and is positioned above the thin wire core, the upper cladding buries therein the ridge and is disposed on the slab layer, a refractive index of material forming the thin wire core is greater than a refractive index of material forming the slab layer, a refractive index of material forming the slab layer is greater than or equal to a refractive index of material forming the ridge, and the refractive index of the material forming the ridge is greater than a refractive index of material forming the lower cladding and a refractive index of material forming the upper cladding, a distance from an upper surface of the lower cladding to an upper surface of the ridge is almost constant with fluctuation in a range of thickness of the thin wire core along a length direction of a waveguide, the optical conversion element includes a first tapered part with a cross-sectional area of the thin wire core gradually decreasing in a direction to which the mode field expands along a guided direction, and the optical conversion element includes a second tapered part with a width in an upper part of the ridge gradually increasing in the direction to which the mode field expands along the guided direction, thereby converting the mode field of guided light.

3. The optical conversion element according to claim 2, wherein a cross-sectional shape of the ridge vertical to the guided direction is rectangular.

4. The optical conversion element according to claim 2, wherein the second tapered part is disposed to a side of the first tapered part where the mode field is expanded.

5. The optical conversion element according to claim 2, wherein the first tapered part and the second tapered part are partially superimposed.

6. The optical conversion element according to claim 2, wherein the cross-sectional shape of the ridge vertical to the guided direction is convex.

7. The optical conversion element according to claim 2, wherein a cross-sectional shape of the slab layer vertical to the guided direction is convex, and width of an upper surface of a projected part in the convex is same as width of a bottom surface of the ridge.

8. The optical conversion element according to claim 2, wherein a cross-sectional area of the thin wire core gradually decreases in the direction of expanding the mode field along the guided direction in a range of the second tapered part.

9. The optical conversion element according to claim 2, wherein the refractive index of the material forming the slab layer is greater than the refractive index of the material forming the ridge.

10. The optical conversion element according to claim 9, wherein the refractive index of the material forming the slab layer is greater than the refractive index of the material forming the ridge by 0 to 0.3%.

11. The optical conversion element according to claim 1, wherein the innermost core is formed of a semiconductor.

12. The optical conversion element according to claim 11, wherein the semiconductor is silicon.

13. The optical conversion element according to claim 1, wherein the first outer core is formed of a silicon compound or polymer.

14. The optical conversion element according to claim 13, wherein the silicon compound is one of silicon dioxide, silicon nitride, silicon oxynitride, phosphorus-silica glass, boron-phosphorus-silica glass, and germanium-silica glass.

15. The optical conversion element according to claim 2, wherein the first outer core is connected to a second thin wire core at a connection end side with an optical fiber, material of the second thin wire core has a same or almost same refractive index and width as the refractive index and width of the material forming the ridge of the first outer core, and a cross-section of the second thin wire core is rectangular or almost rectangular.

16. An optical conversion element manufacturing method comprising:

forming a waveguide structure including an innermost core, a first outer core, lower cladding, and upper cladding, the first outer core being outside the innermost core;

forming the innermost core into a reverse tapered type with a cross-sectional area gradually decreasing in a direction to which a mode field expands along a guided direction; and forming the first outer core into a forward tapered type that includes a ridge and a cross-sectional area gradually increasing in the direction to which the mode field expands along the guided direction, wherein the innermost core is composed of a thin wire core that is disposed on the lower cladding, the first outer core includes a slab layer that buries therein the thin wire core and is disposed on the lower cladding and a ridge that is disposed on the slab layer and is positioned above the thin wire core, the upper cladding buries therein the ridge and is disposed on the slab layer, and a refractive index of material forming the thin wire core is greater than a refractive index of material forming the slab layer, a refractive index of material forming the slab layer is greater than or equal to a refractive index of material forming the ridge, and the refractive index of the material forming the ridge is greater than a refractive index of material forming the lower cladding and a refractive index of material forming the upper cladding.

* * * * *